United States Patent [19]

Van Gilst

[11] 4,401,057
[45] Aug. 30, 1983

[54] HOG FEEDER

[75] Inventor: Carl W. Van Gilst, Goshen, Ind.

[73] Assignee: Chore-Time Equipment, Inc., Milford, Ind.

[21] Appl. No.: 308,949

[22] Filed: Oct. 5, 1981

[51] Int. Cl.³ .............................................. A01K 5/02
[52] U.S. Cl. ............................. 119/51 R; 119/51.11; 119/52 AF; 119/54; 119/51.5
[58] Field of Search ............ 119/51 R, 51.11, 52 AF, 119/53, 53.5, 54, 56 R, 51.5

[56] References Cited

U.S. PATENT DOCUMENTS

| | | | |
|---|---|---|---|
| 694,760 | 3/1902 | Lathrop | 119/51.5 |
| 2,298,398 | 10/1942 | Marshaus | 119/51.5 |
| 2,644,425 | 7/1953 | Hazen | 119/53.5 |
| 3,102,511 | 9/1963 | Atcheson | 119/53 |
| 3,157,157 | 11/1964 | Clay et al. | 119/51.11 |
| 3,269,358 | 8/1966 | Hawley | 119/51.12 |
| 3,359,947 | 12/1967 | Biehl | 119/51.12 |
| 3,386,418 | 6/1968 | Biehl | 119/51 R |
| 3,786,785 | 1/1974 | Olde | 119/51.5 |
| 3,971,340 | 7/1976 | Allen | 119/52 AF |
| 4,337,728 | 7/1982 | Van Gilst et al. | 119/51 R |

FOREIGN PATENT DOCUMENTS

| | | | |
|---|---|---|---|
| 1037323 | 8/1978 | Canada | 119/51 R |
| 2317654 | 11/1974 | Fed. Rep. of Germany | 119/52 AF |

*Primary Examiner*—Hugh R. Chamblee
*Attorney, Agent, or Firm*—Trexler, Bushnell & Wolters, Ltd.

[57] ABSTRACT

A novel feeding system and feeder unit for supplying feed to hogs and like animals is disclosed. The feeding system includes a plurality of the novel feeders, and a feed conveyor adapted to deliver feed to each feeder. Each feeder comprises an immobile pan, and superstructure affixed over and to the pan. A threaded shaft is journaled so as to extend upwardly from the pan. A rotor gate is journaled over the pan and is threaded on the shaft means. Under normal conditions, the rotor gate simply turns within the pan and agitates the feed being consumed by the hogs. However, when a latch is depressed, the threaded shaft is immobilized, and rotation of the rotor gate about the immobilized shaft acts to raise and lower the rotor gate relative to the pan. This relative motion adjusts the size of at least one feed-delivery gate space defined between the rotor gate and the pan.

28 Claims, 8 Drawing Figures

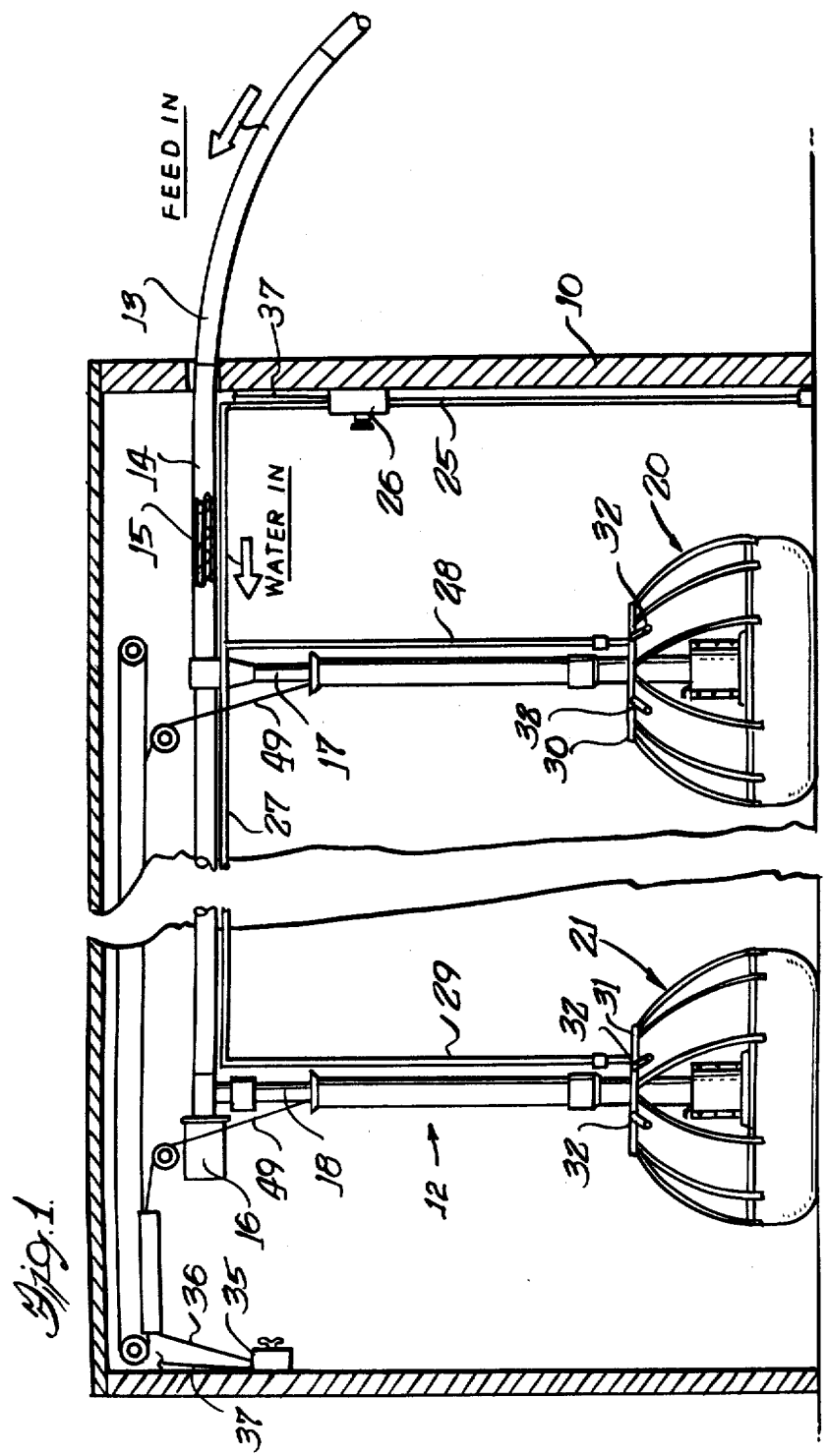

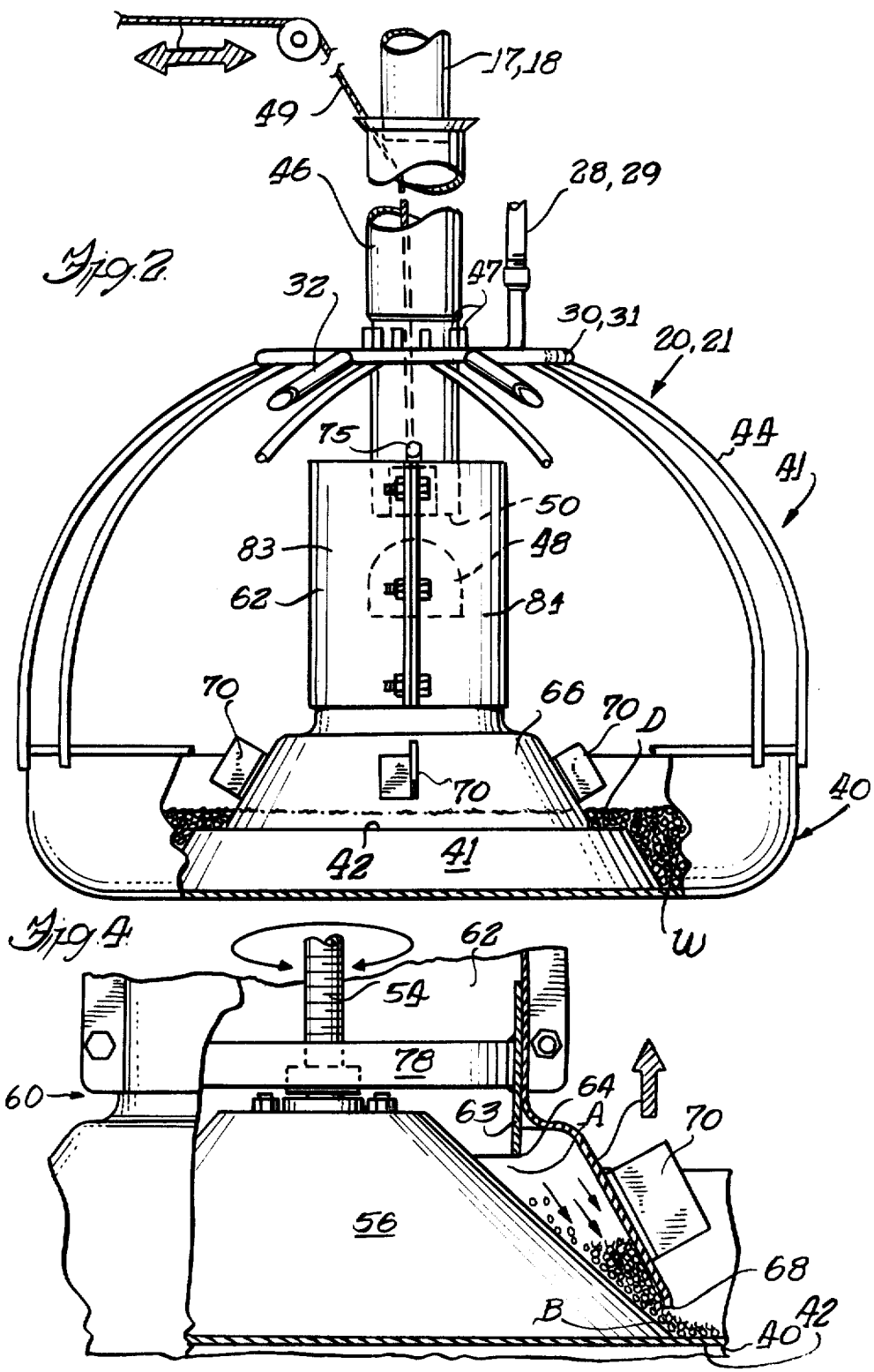

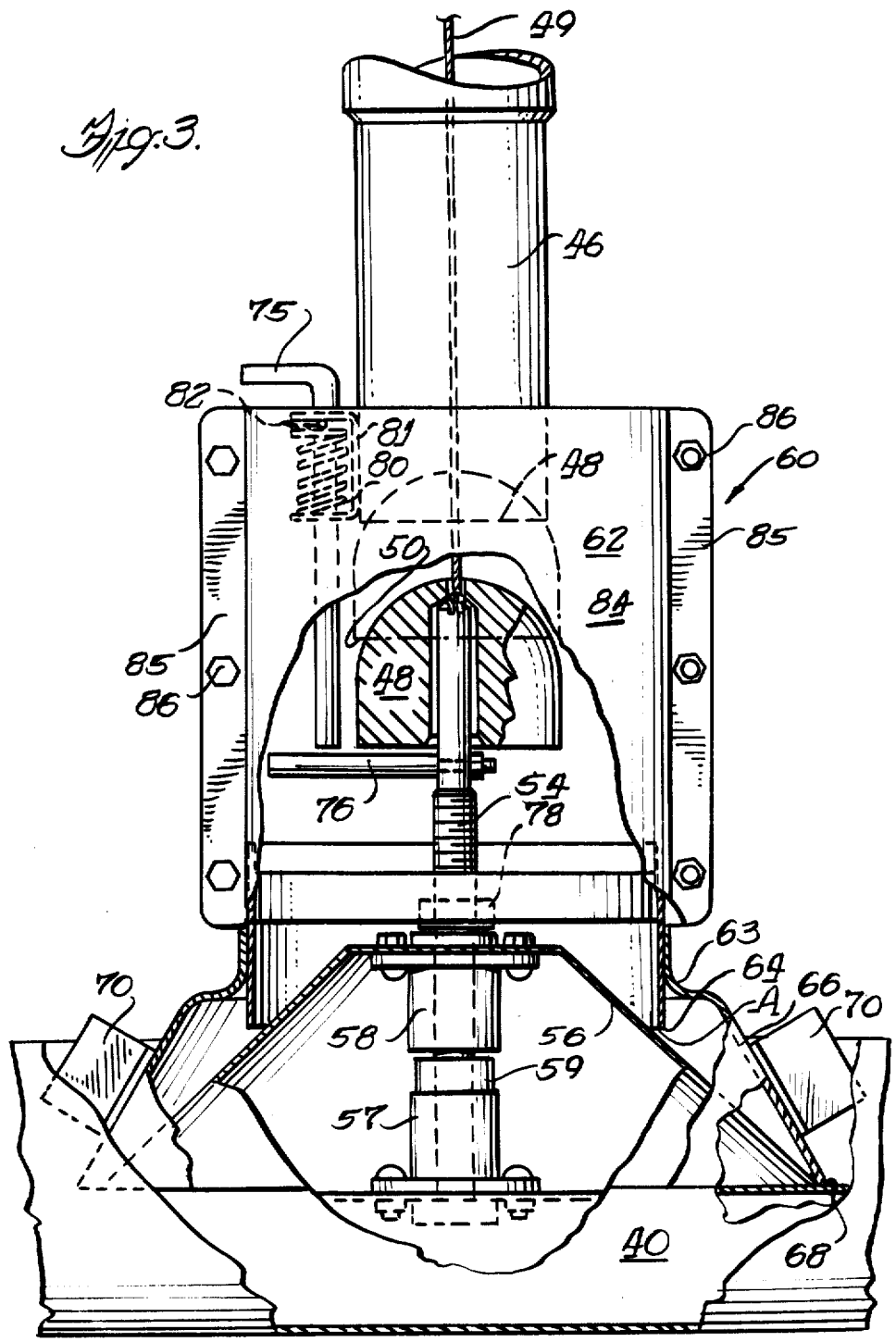

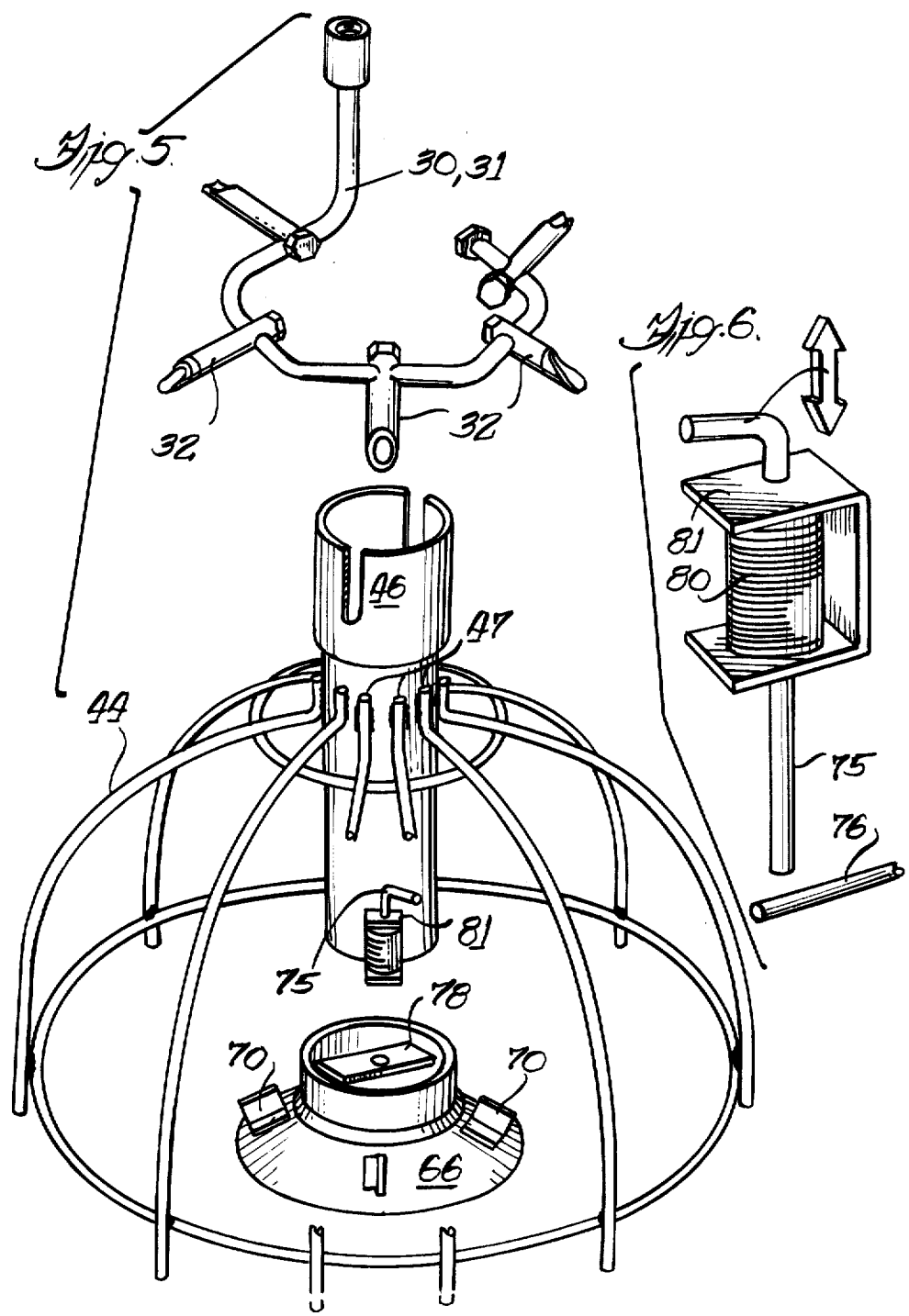

HOG FEEDER

DESCRIPTION OF THE INVENTION

This invention relates generally to apparatus for feeding hogs and like apparatus, and more particularly concerns a hog feeder which is especially adapted for use with a programmed hog feeding system and method.

Hog husbandry has been practiced by mankind for thousands of years. In the relatively recent past, systematic, scientific attempts have been made to raise hogs from sucklings or weaners to fully adult size as rapidly as possible, and with the minimum amount of feed. In this way, the maximum number of hogs are produced during a given period of time with minimum feed and other expenses. Since feed costs presently represent approximately 70% of the total cost of producing pork, the development of feeding systems and methods which maximize feed efficiency without sacrificing growth rate—or, indeed, which actually improve growth rate—are of great benefit to hog husbandmen.

Several hog care plans call for specific quantities of feed to be provided to hogs at specific intervals of time. These quantities of feed are less than the hogs desire, or could consume. Under another feeding method, the feed rations are delivered at specific moments, and permit the hogs to consume the rations whenever they wish. Still another feeding method is disclosed and claimed in U.S. Application Ser. No. 236,831 filed Feb. 23, 1981.

Normally, unlimited supplies of water are made available to growing hogs at all times. Under some feeding plans, however, liquid is mixed with the feed when it is delivered to form a gruel. Under other plans, drinking water may be denied the animals at certain times.

When using preplanned methods of feeding and watering, it is helpful to have feed delivery apparatus and feeder units which can easily, inexpensively and quickly deliver the desired amounts of feed at the desired times in the desired way, and which can also be operated to deny feed to the consuming hogs when desired. Moreover, feeders are more commercially attractive if the husbandman can adjust the maximum delivery rate and amount of feed which the feeder can deliver. These feeders should be of rugged construction, and should operate reliably for long periods of time with but minimal care.

It will be understood that feeders previously designed for poultry and relatively light weight animals cannot be directly adapted for use with hogs, since hogs are heavier, smarter, and treat equipment in their environment more aggressively. Moreover, since hogs are not fed on the same sort of feeding plan as poultry, the requirements for ready feed access, complete feed denial, and the rate of feed delivery are also different.

It is the general object of the present invention to provide a feeder which is especially adapted to feed hogs by a pre-determined feeding plan or method. More specifically, it is an object to provide a hog feeder which will quickly and reliably deliver feed at a given time, and which will effectively halt the delivery of feed at other times.

Another specific object is to provide a hog feeder which is adjustable so as to permit changes in the rate of flow of feed to consuming hogs throughout the growth cycle of the animals. A related object is to provide a mechanism for adjustment which is hidden so as to prevent the hogs from playing with it.

Yet another object is to offer a feeder which provides water at a convenient location for feeding hogs. An ancillary object is to provide such a feeder which will cause spilled drinking water to fall into the feed pan, thereby wetting some of the feed, making it more palatable, and reducing feed dust. Other feed is retained in a dry state, however, to provide a choice of feed to the hogs.

A further object is to provide a feeder which will effectively deliver high-moisture corn and other relatively moist feeds as well as dry granular rations.

Still another object is to provide a feeder which encourages each hog to eat, and which provides inviting feeding spaces for the hogs. Each space provided accommodates a single hog, and discourages him from pushing neighboring hogs away from the feeder.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a side elevational view showing, in somewhat schematic form, a novel hog feeding system utilizing the novel hog feeders of the present invention;

FIG. 2 is a side elevational view showing in further detail the hog feeder of the present invention;

FIG. 3 is a fragmentary side elevational view in partial section showing in further detail the hog feeder mechanism;

FIG. 4 is a fragmentary side elevational view in partial section somewhat similar to portions of FIG. 3 and showing the hog feeder apparatus in an altered configuration;

FIG. 5 is an exploded view showing portions of the hog feeder superstructure;

FIG. 6 is a perspective view showing in further detail portions of a feeder latch mechanism;

DETAILED DESCRIPTION

Figure 7:
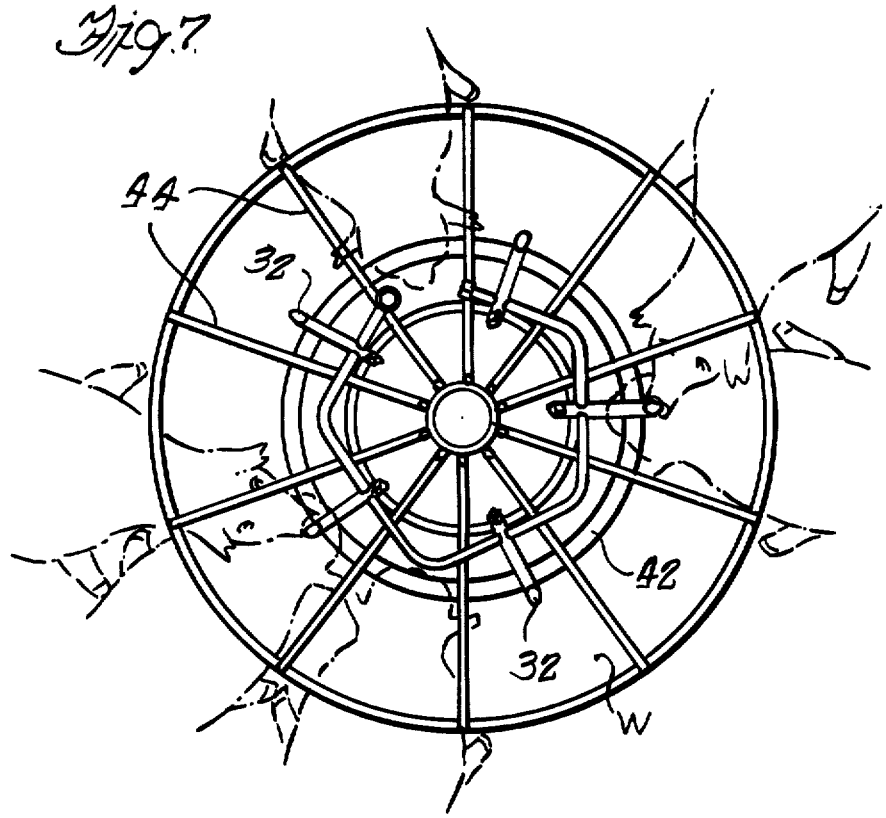
FIG. 7 is a top plan view of the feeder and feedings hogs.

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Turning first to FIG. 1, there is shown in a somewhat schematic or outline form a hog house 10 within which the novel feeder system 12 is installed. Feed is supplied to the house from a remote source (not shown) by a feed conveyor 13. Here, this feed conveyor includes an auger tube 14; within the tube 14, an auger 15 is rotated by an electric motor 16 or other convenient means. Feed is drawn to and past various dropout holes or apertures (not shown) in the tube 14, where the feed falls down drop tube mechanisms 17, 18 into the novel feeders 20, 21.

In accordance with one aspect of the invention, water is supplied to the animals at a convenient location just above the feed pan. To this end, water is routed from a remote source (not shown) by a supply pipe 25 past a shut off valve 26 to a header 27 and branch lines 28, 29. Located just above the feeders are supply rings 30, 31 which are connected to the branch lines 28, 29. Water can be obtained by the hogs from nipple valves 32 which extend from the supply rings 30, 31. Nipple valves of an appropriate design can be obtained from any of several commercial sources.

Figure 8:
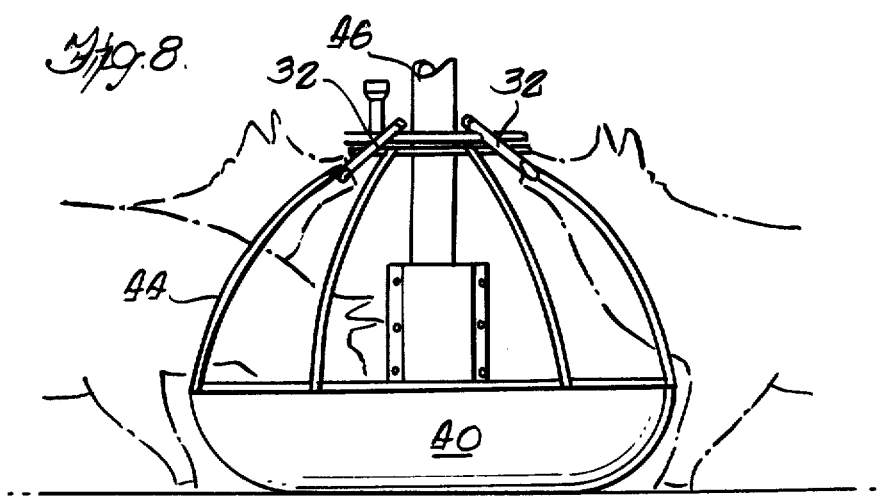
FIG. 8 is a side elevational view of the feeder and feeding hogs.

As illustrated in FIG. 5 the nipple valves 32 extend into or over every other hog feeding space defined by a grill 44. As explained in more detail below, a hungry hog can enter each space defined by the grill 44 to obtain feed. A thirsty hog can obtain water from a nipple which is located directly above him, or over the immediately adjacent feeding space. As shown in FIG. 8, a hog can easily reach directly up or up and over his neighbor to drink from a nipple valve 32. Since each grill-defined hog access space is narrow at the top, a hog who is reaching over his neighbor can only get his nose adjacent the nipple valve; as he drinks he will not disturb his eating neighbor.

In accordance with another aspect of the invention, the feed is made available, and feed is denied, to the hogs at certain pre-selected times. To this end, a timer 35—here, a double switch time clock—is provided at a convenient location. A first interconnector 36 connects this time clock to a pully system more fully described below, and a second interconnector 37 connects the time clock 35 to the water shut off valve 26.

As shown more particularly in FIG. 2, each feeder unit 20, 21 includes an immobile pan 40, and a superstructure 41 affixed over and to the pan 40. Preferably, the pan 40 is secured to the floor of the hog house 10 by brackets or other suitable means (not shown) so as to prevent the hogs from knocking the feeders about the misaligning the conveyors and other apparatus.

In carrying out the invention, the pan 40 is formed with a novel stepped bottom, as illustrated especially in FIGS. 2 and 4. Here, a lower cone formation 41 formed in the center of the pan 40 leads upwardly to a horizontal annular step 42. The step leads, in turn, to an inner and upper cone portion 56. As shown particularly in FIG. 7, two generally distinct feeding areas are thus defined—a first area D above the step 42 and a second area W located radially outwardly from and below the step 42. Because the nipples 32 extend radially beyond the step 42 to points over the second feed repository area W, water dripping from the nipples will fall into the second area W only, and will thus wet the feed in that area W. Feed in the first area D, however, will remain generally dry. Thus, both wet and dry feed are offered to the hogs. Feed consumption and hog growth are encouraged by this arrangement.

The superstructure above the pan includes a grill 44 which can be formed of, for example, galvanized steel rod welded to the pan 40 and oriented in a downwardly extending radial pattern. In the illustrated embodiment, the grill 44 establishes some ten feeding access spaces around the pan 40 which are shaped and spaced to permit the entrance passage of a hog's whole head and neck to the pan 40. This grill design separates hogs from one another at the shoulder, and encourages the hogs to assume radially arrayed positions as indicated in FIG. 7. Each defined feeding space discourages each hog from pushing his neighbor away from the pan. Thus, each hog is encouraged to retain possession of an eating space at the feeder unit. Each hog is also discouraged from claiming more than his share of feed, or dragging feed out of the pan. The grill does not obstruct the hog's view while he is eating and permits unobstructed movement of air around the hog's head, yet the grill shape discourages the hog from withdrawing or moving away from the feeder before the hog finishes his meal.

As explained above, feed is delivered to the feeder unit 20, 21 through the drop tube devices 17, 18. To receive and direct this feed, the feeder superstructure 41 includes a drop tube element 46 affixed, as by weldments 47 or other convenient means, to the grill work 44 in a position to receive feed from the upper drop tube devices 17, 18, and to direct this feed downwardly into the pan 40.

It is another feature of the invention that a stopper plug 48 is carried below the drop tube 46, on a plug control cable or pull cord 49. This stopper element 48 can be a conical or ball-like element, or it can be provided with some other suitable shape; it can be made of cast iron or other material. As can be envisioned from FIG. 3 when the stopper element 48 is pulled upwardly by the pull cord 49, the stopper element 48 engages and co-operates with a lower or distal end 50 of the drop tube element 46 so as to prohibit the flow of feed down the drop tube element and into the pan. When, however, the pull cord 49 is released by the timer 35 and timer cable drive 36, (FIG. 1) the stopper element 48 falls away from the drop tube distal end 50 into the position shown in phantom lines in FIG. 2 and solid lines in FIG. 3. Feed is thus allowed to fall out of the drop tube element 46 and into lower feed distribution portions of the feeder 20, 21.

As explained above, it is a feature of the invention that the feeder can be adjusted to deliver varying amounts or rates of feed flow so as to accommodate hogs of various sizes, or to accommodate hogs as they grow from one size to another. To do this, the size of feed flow gate spaces A and B shown in FIG. 4 can be adjusted. In accordance with this aspect of the invention, and as shown in FIGS. 2, 3 and 4, a threaded shaft 54 is journaled upon and extends upwardly from a stepped cone 56 forming part of the pan 40. Here, a lower bearing 57 formed of nylon or other suitable material is bolted or otherwise affixed to a lower portion of the pan 40, and an upper bearing 58 is bolted or otherwise affixed below the crown portion of the pan cone 56. Through these bearings 57 and 58, the shaft 54 extends. A set collar 59 is secured to the shaft 54 between the two bearings 57 and 58 to prevent significant axial movement of the shaft 54.

Over this threaded shaft, a rotor gate assembly 60 is located. The illustrated rotor gate assembly 60 includes an upper sleeve member 62 which extends downwardly to a first flange 63 terminating in a distal end 64. This distal end 64 forms, together with the pan cone 56, a first gate A through which feed can pass.

Extending outwardly and downwardly from the flange 63, a rotor cone flange or gate member 66 depends. This rotor cone flange 66 has a distal or lower end 68 positioned for a contact with the pan 40, as shown in FIG. 3. Alternatively, as will be explained, the distal end 68 can be moved or located upwardly away from the pan 40 as shown in FIG. 4. Under these circumstances, the space between this rotor cone flange end 68 and the pan 40 forms a second or lower feeding gate B through which feed can pass.

As shown in FIGS. 2, 3, 4 and 5, a plurality of paddle elements 70 extend radially outwardly from the rotor gate member 66. It is a feature of the invention that these devices encourage even feed distribution within the pan. As the hogs feed, they engage the rotor gate member 66 and the paddle elements 70, and rotate the device. As the device rotates, the paddle elements 70 agitate the feed, thus encouraging even feed distribution within the pan and mixing the feed constituents, even after the feed has been delivered into the pan and is being consumed.

Now, when it is desired to alter the size of the feed gates A and B in accordance with the invention, a latch pin 75 can be depressed from the position shown in FIG. 3 so as to be located to engage a stop pin 76 which is attached to and radially extends from the threaded shaft 54. As the hog husbandmen depresses the latch pin 75 with one hand, he rotates the rotor gate cone 66 with his other hand. For a portion of the first revolution of the rotor gate element 66, the threaded shaft 54 and stop pin 76 turn coangularly, as they do when the rotor gate element is being pushed about by the hogs. However, when the stop pin 76 engages the depressed latch pin 75, the stop pin-latch pin interengagement inhibits stop pin rotation and, consequently, inhibits further rotation of the threaded shaft 54.

It will be noted that a threaded through brace or block 78 is affixed to the rotor gate element 66, and is screwed upon the threaded shaft 54 (FIG. 4). Consequently, the threaded shaft 54 is latched against rotation and when the rotor gate element 66 is turned further, this relative motion of the rotor gate element 66 over the immobilized threaded shaft 54 will cause the rotor gate 66 to be raised or lowered axially upwardly or downwardly along and over the shaft 54. In this way, the sizes of the gate spaces A and B are adjusted or changed. A change in these gate sizes correspondingly adjusts the rate at which feed can flow from the drop tube 46 into the pan 40 for consumption by the hogs.

Normally, however, the latch pin 75 does not engage the stop pin 76. To insure this, a biasing element such a compressed coil spring 80 is carried in a U-shaped latch pin mounting member 81 which is affixed, as by welding or other convenient means, to the immobile drop tube element 46. (See FIGS. 5 and 6). A cotter pin 82 extends through the latch pin 75 and is engaged by the spring 80. The spring 80 thus urges the cotter pin 82 and the latch pin 75 upwardly into a position in which the latch pin 75 will not engage the stop pin 76.

To hide the latch assembly from the hogs, and to prohibit them from playing with the latch and gates A and B, the sleeve structure 62 extends upwardly around and over most of the latch pin 75. For convenience, this sleeve structure 62 can be formed in two parts 83, 84 which are secured at flanges 85 to one another by bolts 86.

The invention is claimed as follows:

1. A feeder for supplying feed to hogs and like animals, comprising the combination of an immobile pan, a superstructure affixed over and to the pan, threaded shaft means journaled by and extending upwardly from the pan, rotor gate means disposed over the pan and threadedly attached to the shaft means, and latch means carried by the superstructure for selectively engaging the threaded shaft means to inhibit shaft means rotation when the rotor gate means is rotated, the rotation of the rotor gate means about the immobilized shaft means acting to raise and lower the rotor gate means relative to the pan means and thereby adjust the size of at least one feed delivery gate space defined between the rotor gate means and the pan.

2. A feeder according to claim 1 wherein said threaded shaft means includes a shaft member journaled by and extending upwardly from the pan and a stop pin extending from the shaft member for engagement by the latch means.

3. A feeder according to claim 2 wherein said latch means includes latch pin means mounted for movement into a position to engage said stop pin, and biasing means for normally urging the latch pin into a position in which the latch pin will not engage the stop pin.

4. A feeder according to claim 1 wherein said superstructure includes grill means affixed to the pan, and feed drop tube means affixed to the grill means and supported above the pan.

5. A feeder according to claim 4 wherein said latch means includes a latch pin mounting member carried by the feed drop tube means.

6. A feeder according to claim 4 including stopper valve means cooperable with said feed drop tube means for holding feed within and alternatively permitting feed to flow down the drop tube means and into said pan.

7. A feeder according to claim 6 including pull cord means attached to said stopper valve means for drawing said stopper valve means into engagement with said feed drop tube means.

8. A feeder according to claim 6 further including timer means for operating the stopper valve means so as to deliver feed at at least one pre-set time.

9. A feeder according to claim 8 wherein said timer means includes a double switch time clock to operate the stopper valve means so as to halt the delivery of feed at the end of a pre-set feed delivery time.

10. A feeder according to claim 1 further including water supply means located above the pan means.

11. A feeder according to claim 10 wherein said water supply means is further located adjacent said grill means.

12. A feeder according to claim 10 wherein said water supply means includes at least one nipple waterer valve.

13. A feeder according to claim 10 wherein said water supply means includes a plurality of nipple waterer valves, and a water supply conduit for delivering water to said nipple waterers.

14. A feeder according to claim 1 wherein said rotor gate means includes feed agitation means for encouraging even feed distribution within the pan.

15. A feeder according to claim 14 wherein said feed agitation means includes a plurality of paddle elements extending radially outwardly from the rotor gate means.

16. A feeding system for supplying feed to hogs and like animals, comprising the combination of a plurality of feeders, and a feed conveyor adapted to deliver feed to each feeder, each feeder comprising an immobile pan, a superstructure affixed over and to the pan, shaft means journaled by and extending upwardly from the pan, rotor gate means journaled iover the pan on the shaft means and latch means carried by the superstructure for selectively engaging the shaft means to inhibit shaft means rotation when the rotor gate means is rotated, the rotation of the rotor gate means about the immmobilized shaft means acting to raise and lower the rotor gate means relative to the pan means and thereby adjust the size of at least one feed-delivery gate space between the rotor gate means and the pan.

17. A feeding system according to claim 16 wherein said feeder latch means include pin means mounted for movement into a position to engage and immobilize the shaft means, and biasing means for normally urging the latch pin into a position in which the latch pin will not engage and immobilize the shaft means.

18. A feeding system according to claim 16 wherein each feeder includes stopper valve means cooperable with a feed drop tube means for halting and alternatively permitting the flow of feed along the drop tube means and into lower portions of the feeder.

19. A feeding system according to claim 18 further including timer means for operating each stopper valve means so as to simultaneously deliver feed to each feeder at a given pre-set time.

20. A feeding system according to claim 19 including water supply means located above each feeder unit for delivering, on demand, water to consuming hogs.

21. A feeding system according to claim 19 further including water supply means located above each feeder unit, and wherein said timer means includes a double switch time clock to operate the stopper valve means so as to halt the delivery of feed at the end of a pre-set delivery time period, and to permit the initiation of water delivery and the termination of water delivery at pre-selected times.

22. A feeder for supplying feed to hogs and like animals, comprising the combination of an immobile pan, feed drop tube means supported above the pan for receiving feed from a remote source and having a distal end above the pan bottom, stopper valve means adapted to be alternatively urged in an upward direction into engagement with the feed drop tube distal end for holding feed within the feed drop tube means, and to be released downwardly away from the drop tube means for permitting feed to flow down the drop tube means and into the pan, rotor gate means disposed for normally free rotation over the pan, and selectively actuatable means for raising and lowering the rotor gate means relative to the pan so as to adjust the size of at least one feed delivery gate space defined between the rotor gate means and the pan.

23. A feeder according to claim 22 including grill means affixed to said pan, said drop tube means being affixed to the grill means.

24. A feeding according to claim 22 including pull cord means attached to said stopper valve means for drawing said stopper valve means into engagement with said feed drop tube distal end.

25. A feeder for supplying feed to hogs and like animals comprising the combination of an immobile pan, water supply means located above the pan and adapted to dispense water down into the pan from at least one predetermined location, the pan having a bottom defining a horizontal, annular step which divides the pan into an inner, upper area for holding dry feed, and an outer, lower area having its bottom below the upper area bottom and being disposed directly below the water supply means for holding wet feed.

26. A feeder according to claim 25 wherein the pan is round, and wherein the dry feed holding are is located radially inwardly of the wet feeding area.

27. A feeder for supplying feed to hogs and like animals comprising the combination of an immobile pan, grill means affixed to the pan, the grill means including an array of radially oriented rod members extending downwardly to the pan from a position above the pan, adjacent rods defining an individual feeding space into which a single hog can enter to his shoulders, and discouraging each feeding hog from pushing his neighbor away from the pan, and rotor gate means disposed for normally free rotation over the pan, and selectively actuatable means for permitting the rotor gate means to be raised or lowered relative to the pan so as to adjust to the size of at least one feed delivery gate space defined between the rotor gate means and the pan.

28. A feeder according to claim 27 including water dispensing means mounted above every other feeding space defined by the grill means rods.

* * * * *